United States Patent
Nikitin et al.

(10) Patent No.: US 10,503,937 B2
(45) Date of Patent: Dec. 10, 2019

(54) SELF-STEERING RFID TAGS

(71) Applicant: INTERMEC, INC., Lynnwood, WA (US)

(72) Inventors: Pavel Nikitin, Seattle, WA (US); Stephen J. Kelly, Marion, IA (US)

(73) Assignee: INTERMEC, INC., Lynnwood, WA (US)

( * ) Notice: Subject to any disclaimer, the term of this patent is extended or adjusted under 35 U.S.C. 154(b) by 113 days.

(21) Appl. No.: 14/985,672

(22) Filed: Dec. 31, 2015

(65) Prior Publication Data

US 2017/0200029 A1 Jul. 13, 2017

(51) Int. Cl.
| | |
|---|---|
| *G06K 7/10* | (2006.01) |
| *H01Q 1/12* | (2006.01) |
| *H01Q 1/22* | (2006.01) |
| *H01Q 1/38* | (2006.01) |
| *H01Q 19/10* | (2006.01) |
| *H01Q 19/30* | (2006.01) |
| *H01Q 21/26* | (2006.01) |

(52) U.S. Cl.
CPC ..... *G06K 7/10099* (2013.01); *G06K 7/10168* (2013.01); *G06K 7/10405* (2013.01); *H01Q 1/1257* (2013.01); *H01Q 1/2225* (2013.01); *H01Q 1/38* (2013.01); *H01Q 19/106* (2013.01); *H01Q 19/30* (2013.01); *H01Q 21/26* (2013.01)

(58) Field of Classification Search
CPC .......... G06K 7/10099; G06K 7/10168; G06K 7/10405; H01Q 1/1257; H01Q 1/2225; H01Q 1/38; H01Q 19/106; H01Q 19/30; H01Q 21/26
See application file for complete search history.

(56) References Cited

U.S. PATENT DOCUMENTS

| | | | |
|---|---|---|---|
| 6,307,517 B1 * | 10/2001 | Lee ...................... | G06K 7/0008 343/741 |
| 7,423,539 B2 | 9/2008 | Hyde et al. | |
| 8,199,689 B2 | 6/2012 | Maltseff et al. | |
| 8,952,792 B1 | 2/2015 | Srinivas et al. | |
| 9,715,609 B1 * | 7/2017 | Fink ................... | G06K 7/10366 |

(Continued)

OTHER PUBLICATIONS

May 22, 2017 Search Report issued in European Patent Application No. 16206842.3.

*Primary Examiner* — James J Yang
(74) *Attorney, Agent, or Firm* — Oliff PLC; R. Brian Drozd

(57) ABSTRACT

A passive, self-steering antenna device is provided along with methods pertaining to operations and controls of the antenna device. The antenna device can include a main antenna for receiving an unmodulated wireless signal, a power harvester configured to obtain power from the unmodulated wireless signal, a main circuit disposed in a central region of the antenna device, and a plurality of peripheral distributed antenna elements configured to modify the radiation pattern of the antenna device. The antenna device can be configured to operate automatically device without needing control information in response to receiving a message from another antenna. Related methods include operations and controls for such an antenna device including automatically performing actions to enhance communications with another antenna device by selecting and activating a subset of the peripheral antenna elements to create a radiation pattern.

13 Claims, 9 Drawing Sheets

(56) References Cited

U.S. PATENT DOCUMENTS

| | | | |
|---|---|---|---|
| 2007/0087719 A1* | 4/2007 | Mandal | H01Q 1/22 |
| | | | 455/299 |
| 2007/0279225 A1 | 12/2007 | Pellerano et al. | |
| 2009/0069970 A1* | 3/2009 | Posamentier | G06Q 10/087 |
| | | | 701/29.6 |
| 2012/0062366 A1 | 3/2012 | Pappu et al. | |
| 2012/0206243 A1* | 8/2012 | Butler | G06K 7/0008 |
| | | | 340/10.51 |
| 2012/0299706 A1* | 11/2012 | Koo | G06K 19/0713 |
| | | | 340/10.1 |
| 2014/0375501 A1 | 12/2014 | Nikitin | |
| 2015/0091706 A1 | 4/2015 | Chemishkian et al. | |

* cited by examiner

SELF-STEERING RFID TAGS

BACKGROUND

Smart antennas and reconfigurable antennas have been used in applications for wireless network communications including communications via radio-frequency identification (RFID) tags and for Wi-Fi devices, and they provide many beneficial features in these applications. However, they are overly complex and expensive to make and use. Smart antennas, which are also known as adaptive array antennas and multiple-input multiple-output (MIMO) antennas, are highly adaptable devices that use complex algorithms and modifiable antenna configurations to communicate effectively on a wireless network. However, these highly adaptable devices require external variable power to support their adaptable configurations, which include changing their antenna configurations, performance and other parameters as needed.

Smart antennas also operate with phase distribution system controls that manage a phased array of antenna devices cooperating with each other to steer radio beams and adapt to network parameters as needed for effective network communications. However, such networks and devices are expensive. Further, they are complicated to design, manage and maintain due to the multiple changeable components required in the antenna devices, not to mention due to the complexity of their control mechanisms that ensure coordinated control of the antenna elements, as well as their need for external variable power requirements.

Reconfigurable antennas likewise include modifiable elements that permit antenna configuration changes to be made, but the antenna device itself in these systems is more compact than with smart antennas. Similar to smart antennas, reconfigurable antennas can be electronically switched as needed to enable and disable communications and modify antenna parameters. Conventional reconfigurable antennas include variable resistors in the form of PIN diodes and small switches in the form of micro-electro-mechanical system (MEMS) switches, which are controlled to modify the antenna configurations.

Both Smart and Reconfigurable conventional antennas require external variable power supplies and DC bias lines in order to provide power for changing their configurations, as well as for supporting their complex logic elements and control mechanisms. Both of these conventional antenna systems also require complex circuitry and support features, such as fiber optic lines, DC biased RF feeds, and other complex circuitry components. As such, conventional Smart and Reconfigurable conventional antennas require complicated antenna designs, complex controls and elaborate control logic for managing the devices, as well as external variable power supplies to enable their operation.

Implementations of RFID tags have included smart and reconfigurable antenna technologies for various purposes included enabling devices to create ad-hoc mesh networks based on tag-to-tag network communications. These systems are used in a many industries for various purposes including indoor and outdoor environments. The tag-to-tag network communications can allow an ad hoc, robust wireless network to be quickly created with minimal infrastructure requirements.

The use of RFID tags for creating ad hoc networks or for other implementations, involving tag-to-tag communications have primarily been limited to active RFID tags. This is because active RFID tags are generally more adaptable allowing them to change communication parameters quickly and more easily than passive tags, and because they can communicate between each other at much greater distances than passive RFID tags. For example, active RFID tag communication distances may be on the order of several hundred feet between tags versus about a foot or so between passive RFID tags. However, the cost of active RFID tags is considerably higher than passive RFID tags, which can often prohibit their usage.

SUMMARY

Various configurations of a passive, self-steering antenna device and methods for operating and controlling the antenna device are provided. The antenna device can be configured as a passive RFID tag and can include a first main antenna element configured to receive an unmodulated wireless signal, a power harvester configured to obtain power from the unmodulated wireless signal, a plurality of distributed antenna elements disposed generally about the periphery of the device, and a main switch coupled to the power harvester and powered by the obtained power for activating the antenna device. The antenna device further includes a main circuit disposed generally in a central region of the antenna device, and a control unit configured to select a combination of the plurality of distributed antenna elements to activate, which act to provide a non-symmetric radiation pattern for the antenna device while communicating with another antenna device.

Advantages and features of novelty characterizing aspects are pointed out with particularity in the appended claims. To gain an improved understanding of advantages and features of novelty, however, reference can be made to the following descriptive matter and accompanying figures that describe and illustrate various configurations and concepts related to the invention.

BRIEF DESCRIPTION OF THE DRAWINGS

Examples of a self-steering antenna device are illustrated in the figures. The examples and figures are illustrative rather than limiting.

DETAILED DESCRIPTION OF THE EMBODIMENTS

Described in detail below are example configurations of an antenna device for communicating on a wireless network, which is self-powered and self-steering, and operates efficiently without requiring complex controls and independent power sources. The antenna device includes a power harvester that obtains power from a wireless signal at the local antenna element and thereafter automatically performs operations without requiring control inputs or receiving external control data. As such, without needing to receive a control signal or control data, the antenna device is configured to be self-powered, to operate automatically as soon as it begins receiving power via the power harvester, and to be self-steering.

Figure 1:
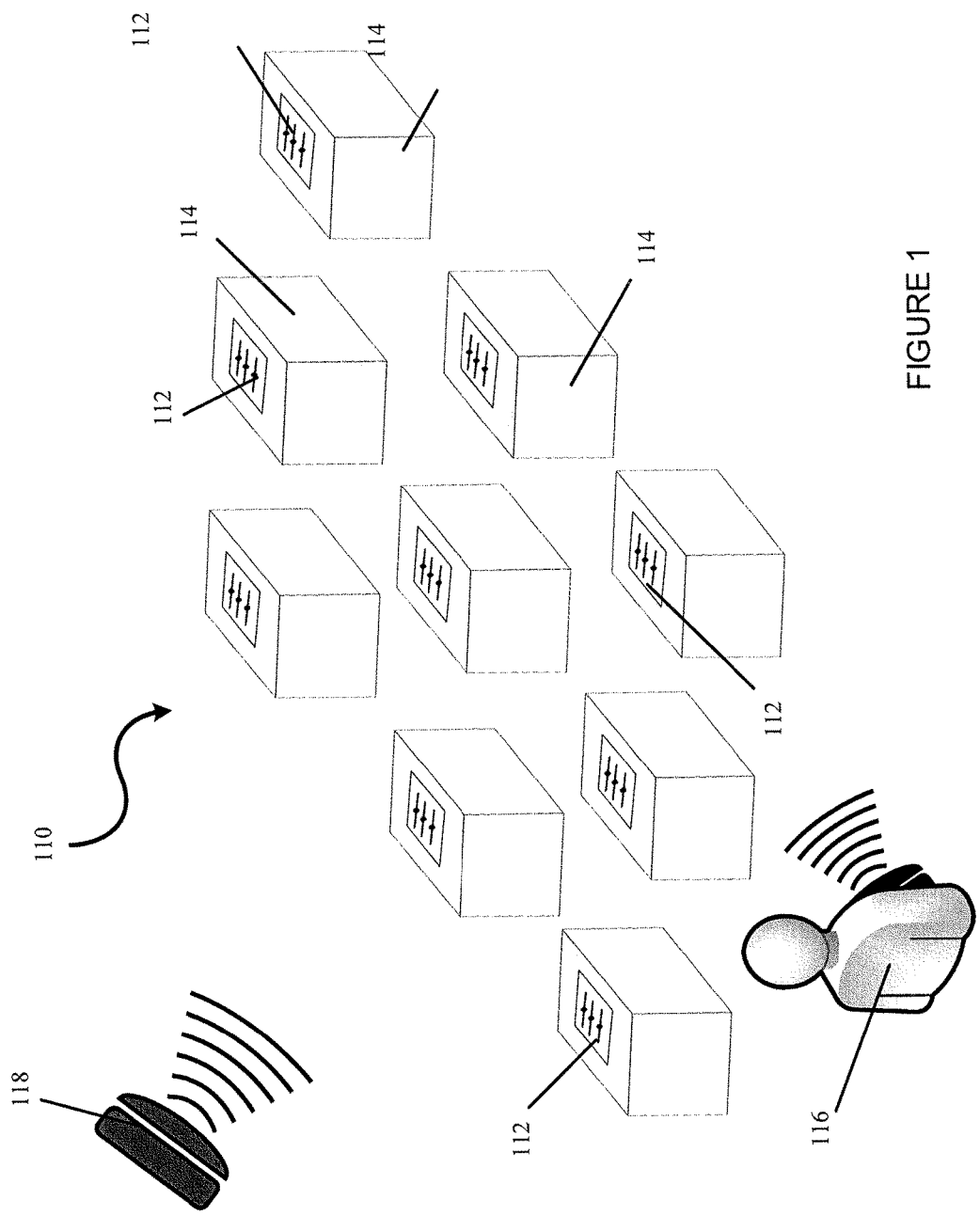
FIG. 1 shows an example arrangement of items (boxes) in a storage arrangement (e.g., warehouse) having self-steering passive RFID tags on each container, in accordance with an embodiment.

Referring now to FIG. 1, an example arrangement 110 is shown of passive, self-steering RFID tags 112 performing operations in a warehouse/transportation environment. In such a common scenario, RFID tags 112 are placed on movable items that need to be tracked, such as boxes 114 being shipped. Of course, the operations, benefits and features of self-steering RFID tags and RFID tags in general could be described under numerous other scenarios and especially those involving movable items, such as asset tracking for a company, monitoring the usage and locations of military equipment and supplies, tracking natural phenomena like oceanic or atmospheric movements, etc., as well as more complex usages such as establishing ad-hoc network systems.

For the scenario shown in FIG. 1 and in most other scenarios involving RFID tags, good communications should exist between portable RFID tags 112 and other RFID devices like RFID reader 116, as well as with each other and with other network devices. Of course, communications between RFID tags 112 and RFID reader 116 is a communication relationship, since RFID technology was on the concept of RFID readers being able to quickly scan a RFID tag and have the tag return a reflected signal its identification information therein.

As such, it is beneficial to the overall system and its operations to enhance the effectiveness of communications between RFID tags 112 and their RFID readers 116. With respect to the scenario of FIG. 1, the item monitoring and tracking functions and other functions performed via RFID communications in warehouse network 110 would be enhanced via passive RFID devices 112 having the ability to self-improve their communications with RFID reader 116 and other devices on the system. Further, enhancing the effectiveness of communications using passive RFID tags can allow passive tags to replace many of the more expensive, complex active RFID tags.

The passive RFID tags 112 are configured to be self-steering with respect to their ability to act independently and for each device being able to self-guide its communications parameters and, in particular, to self-adjust its radiation pattern, to be focused toward RFID reader 116. However, doing so requires the passive (non-powered) RFID tags 112 to be powered and activated during these operations. As shown in FIG. 1, network 112 includes at least one unmodulated, constant waveform (CW) transmitter 118, which transmits a signal at a frequency that will be received by RFID tags 112 and harvested by a power harvester therein, so RFID tags 112 can 'wake up' and have power to perform automatic self-steering operations for communicating with RFID reader 116 and other appropriate devices. In addition, communications are also enhanced by providing wireless signals from an independent source 118 to power RFID tags 112, rather than the tags using a portion of the RFID reader signal 116 for power and thus, reducing the amount available for the reflected signal back to the RFID reader.

Figure 2:
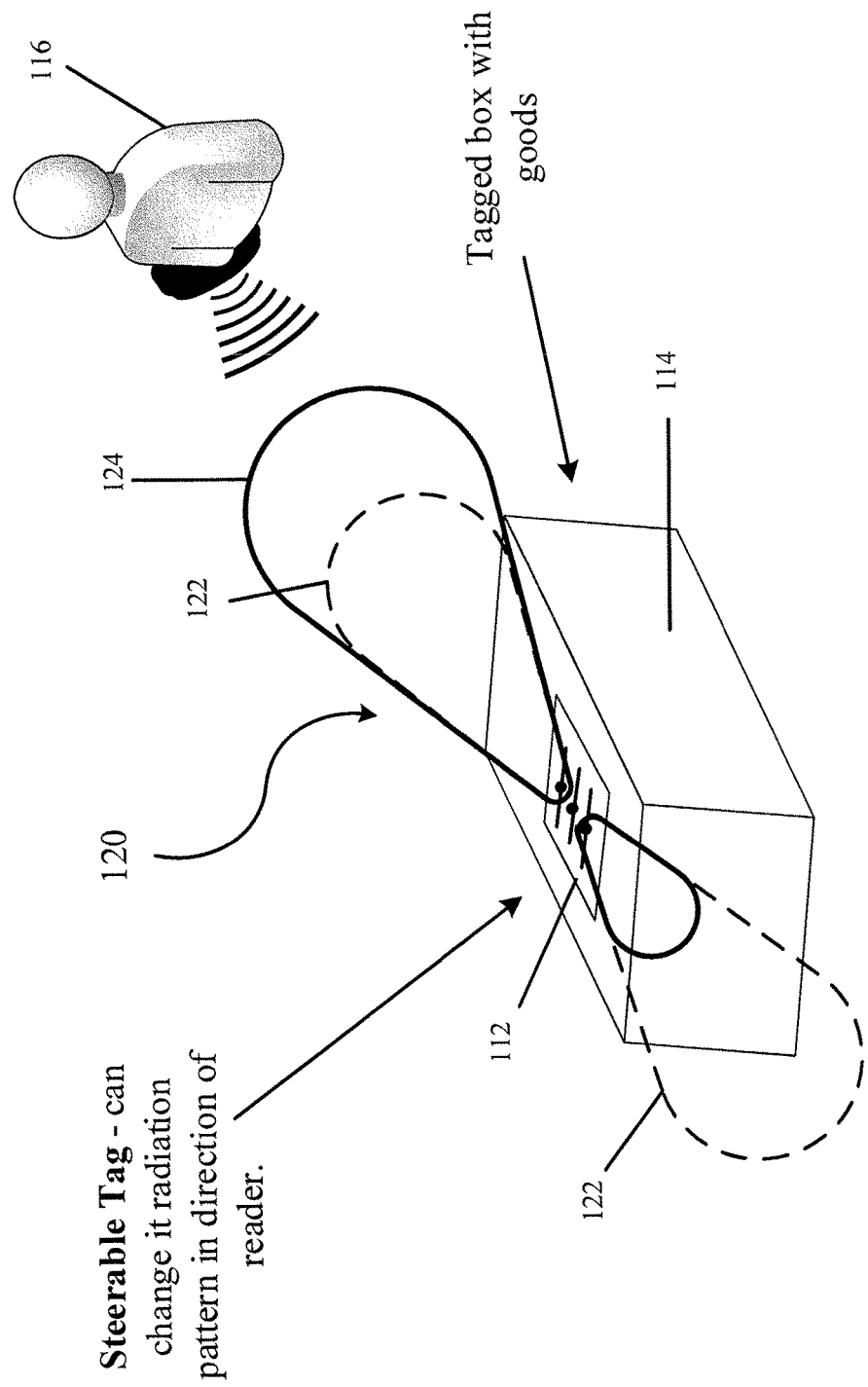
FIG. 2 is a closer view of a transport item shown in FIG. 1 having a self-steerable passive RFID tag thereon along with an illustration indicating a potential radiation pattern for the antenna device in accordance with an embodiment.

FIG. 2 generally illustrates self-steering of the RFID tag's radiation pattern 120 toward RFID reader 116. Dashed lines 122 show the tag's default, symmetrical radiation pattern 122. Solid lines 124 show the tag's biased radiation pattern 124, which has modified to 'point' in the direction of RFID reader 116 and, thus, return messages to RFID reader 116 having a higher signal strength in the direction pointing toward RFID reader 116 than would be provided by the default radiation pattern 120.

In general, passive RFID self-adjustment of its radiation pattern can be accomplished by placing multiple passive antenna elements in regions around the main tag antenna, and then selectively activating combinations of the passive antenna elements to effectively 'shape' the radiation pattern of the main tag antenna. Various levels of controls, logic and input can be designed for determining the combinations of passive antenna elements to activate under what scenarios. However, simple, yet effective, determination mechanisms that can implemented in low-complexity, passive RFID tags relatively easily includes establishing automatic processes in the passive RFID tag to simply try various combinations of passive antenna elements and implement combinations that modify their radiation shape to improve their communications.

Figure 3:
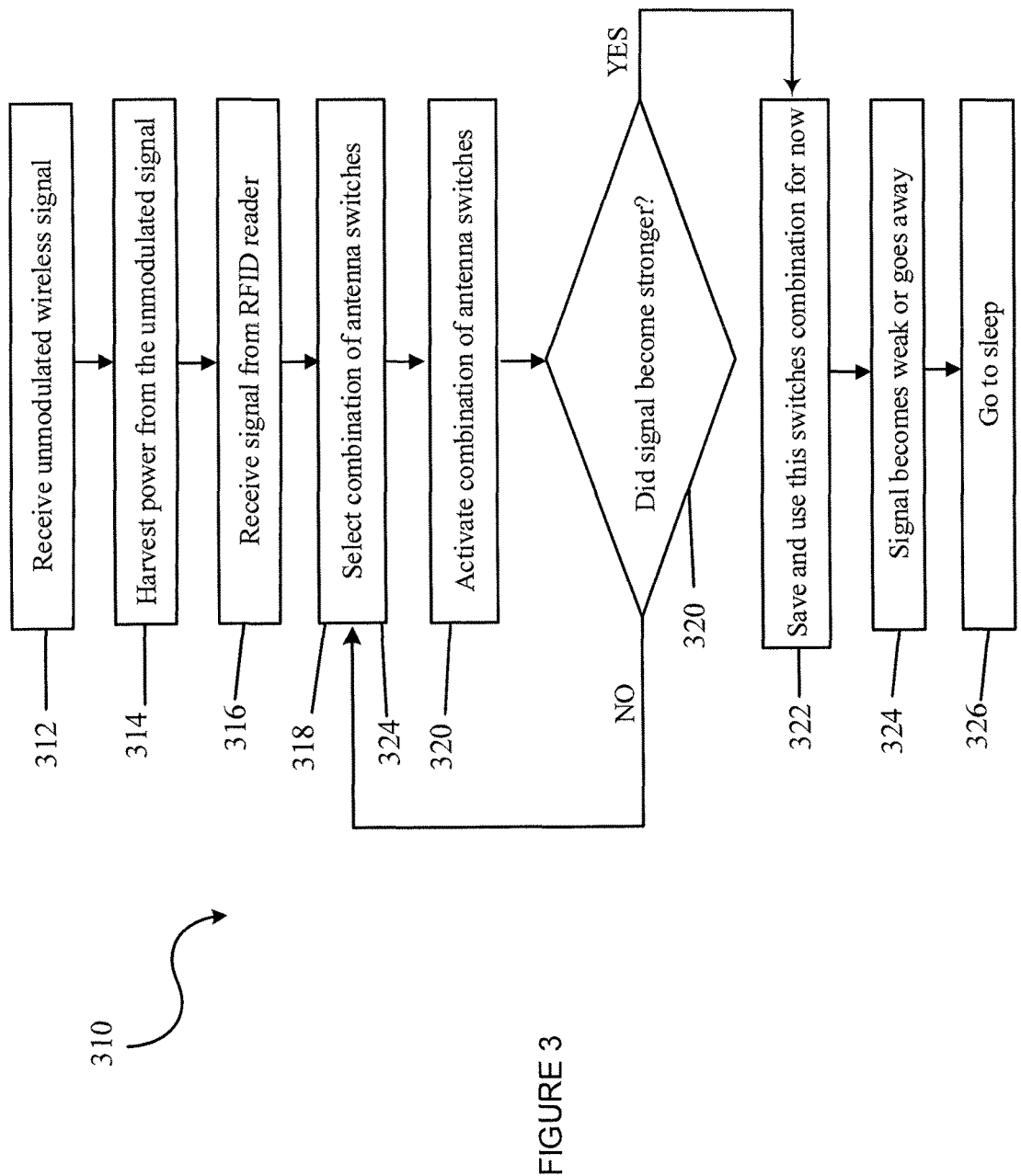
FIG. 3 illustrates example actions and device operations for a self-steering RFID tag with self-steering features when used as part of a method for improving communications in a warehouse/transportation environment, such as the scenario discussed along with FIG. 1, in accordance with an embodiment.

Referring now to FIG. 3, a method 310 is shown for enhancing communications with another antenna device via modification with its radiation pattern. The method generally includes the step 312 of receiving an unmodulated wireless signal along with the step 314 of harvesting power from the unmodulated wireless signal to activate the antenna device and provide power for its operations. At some point, the antenna device performs the step 316 of receiving a signal having a first signal strength from another antenna device, such as RFID reader 116, for which it needs to identify the best combination of passive antenna elements to point its beam toward the sending device. As such, the RFID tag automatically, and without receiving control information to do so, selects a first combination of distributed antenna elements disposed about a peripheral region of the antenna device for forming a radiation pattern to enhance communications with the other antenna device.

Thereafter, RFID tag 112 performs the step 320 of activating the first combination of the distributed antenna elements followed by step 322 of comparing the first signal strength with a second signal strength for communicating with the other antenna device based on the first combination of distributed antenna elements to determine if the signal became stronger for the second signal. If the second signal strength is stronger, the RFID tag performs the step 322 saving and setting the first combination of distributed elements as the combination for communications with the RFID reader, and if not, it performs step 324 of selecting a second combination of the distributed antenna elements repeating steps again for the next combination.

As such, a passive RFID tag can be configured to try several switch combinations automatically when communicating with another device, such as another tag, a tag reader or a network component, and then to select/adopt the best combination of passive antenna elements it finds to point its radiation beam in the direction of the particular device. The RFID tag could be configured to immediately adopt a best option found for communicating with a particular device, such as immediately adopting each combination it tries that improves communications at time with communications are poor.

Alternatively, RFID tag could be configured to select the best option for steering communications toward a particular device after it has tested all combinations that would likely improve communications, which might be better suited for a relatively static situation in which a passive RFID tag will have communications with the same devices over a period of time, and communications are acceptable while testing the possible combinations. The best combination found could be the combination of passive antenna elements that maximize the received reader/other device signal, which is essentially "pointing" its main beam in the direction of the maximum reader signal as shown in the FIG. 2. However, there may be scenarios where point the beam toward the other device may not be the best option, such as if an obstacle intervened or partially blocks signals pointed directly toward the device.

Figure 4:
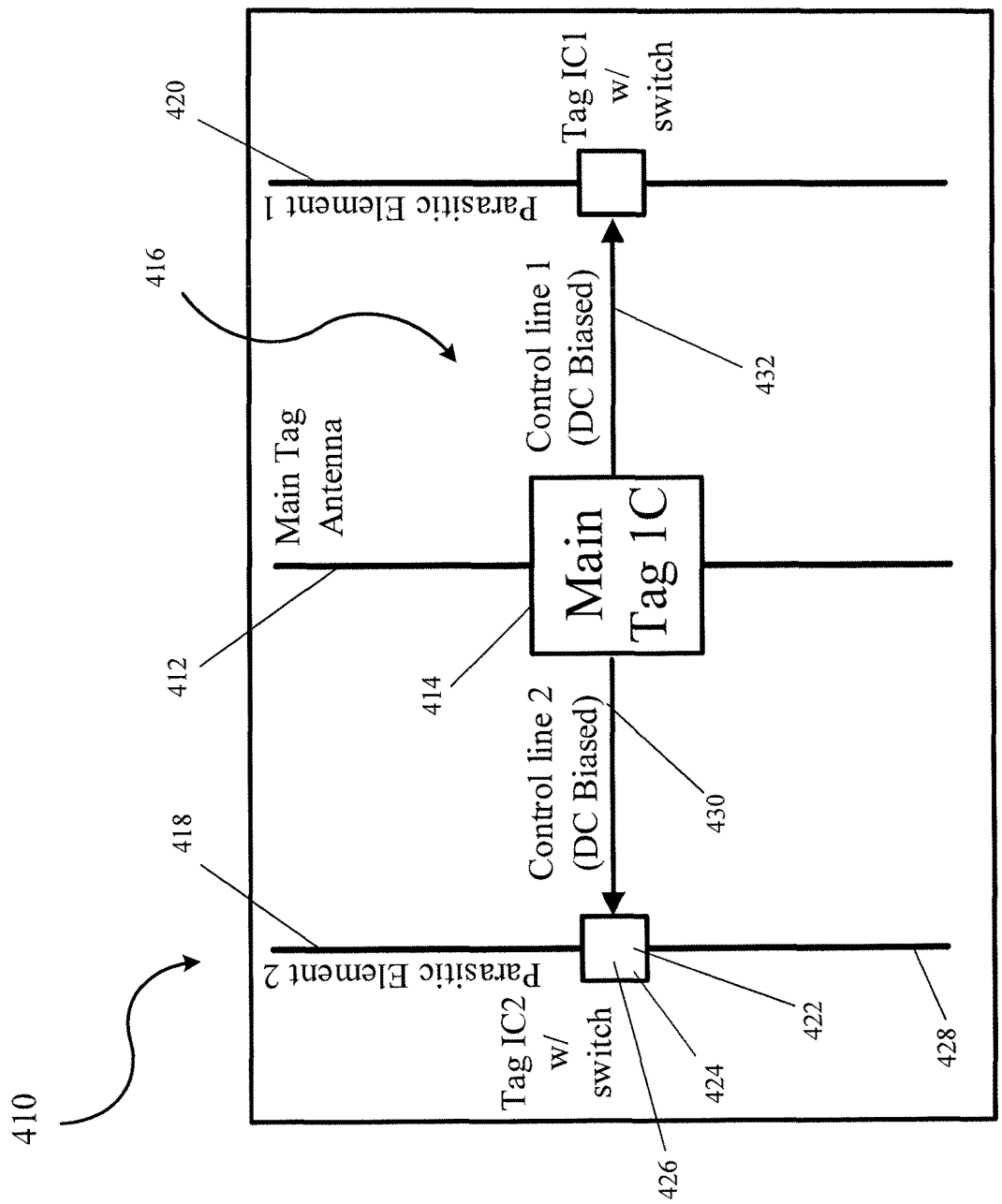
FIG. 4 shows an example model for a first configuration of a self-steering antenna device in accordance with an embodiment.

Referring now to FIG. 4, in one configuration, the passive RFID tag 410 includes a Main Tag Antenna 412, a Main Tag integrated circuit (IC) 414, and a central circuit 416 connecting the Main Tag Antenna 412 and Main Tag IC 414. In addition, RFID tag 410 includes at least a pair of passive antenna elements 418, 420 at peripheral regions of the tag with main circuit disposed therebetween. The passive antenna elements 418 and 420 are configured as Parasitic Elements 418, 420, which each include a corresponding integrated circuit 422 including a controller 424 and switch 426 for driving the Element 428. In addition, RFID tag 410 includes several outputs 430, 432, which carry DC bias control signals to control switches 426 on passive elements 418, 420.

Figure 5:
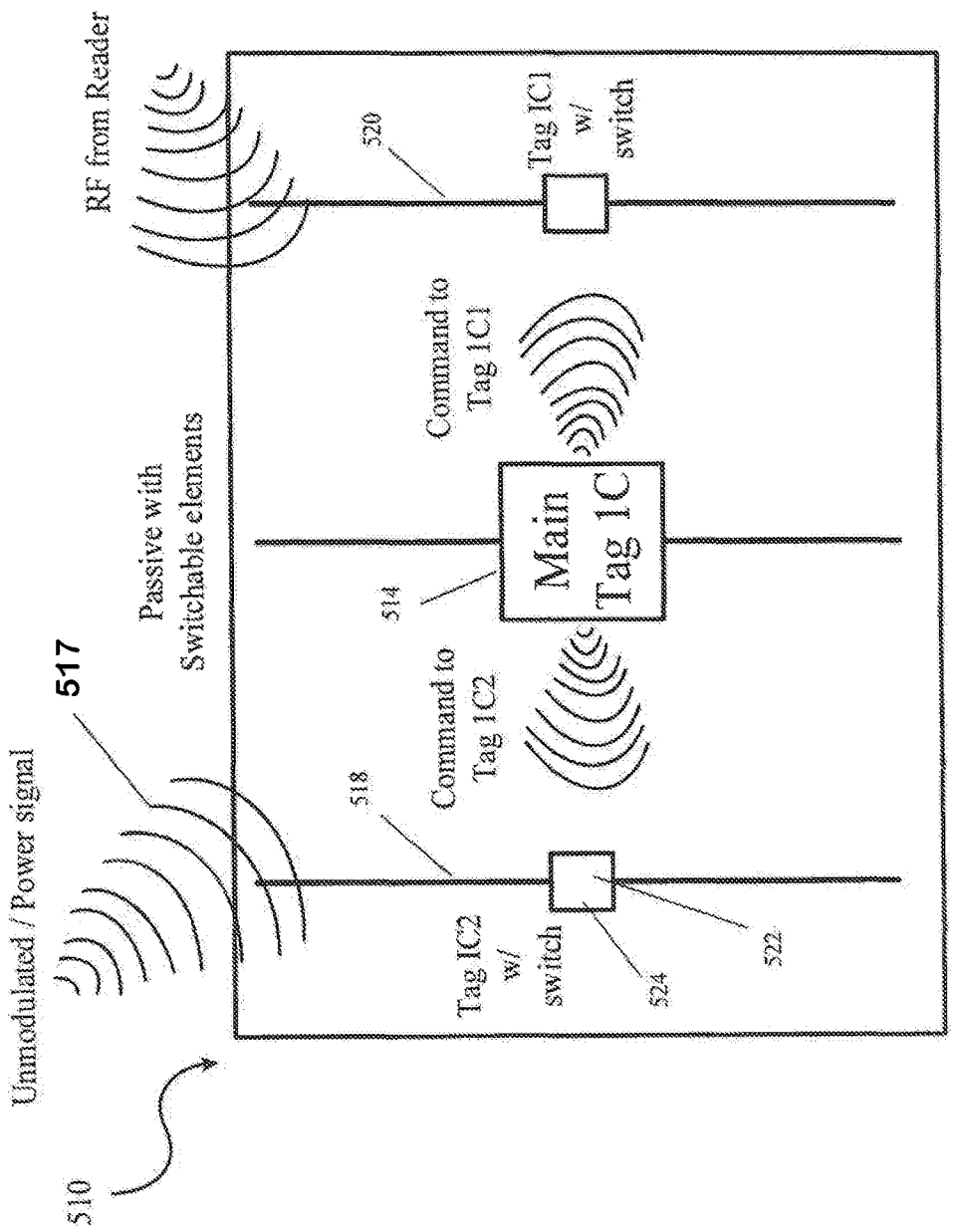
FIG. 5 shows another example configuration for a self-steering passive antenna device according to a second example model of an antenna device in accordance with an embodiment.

Referring now to FIG. 5, another configuration of a RFID tag 510 is shown, which is configured as a passive RFID tag 112 discussed above along with FIGS. 1 and 2, in that the passive antenna elements 518, 520 are powered via an unmodulated signal 517, from which power is harvested at Main Tag 514 and at the Element integrated circuits 522. RFID tag 510 is generally the same as RFID tag 410, except that Elements 518 and 520 are powered along with Main Tag 514 to initially turn on via the unmodulated signal 517, as well as to have power for operations while active. In addition, passive elements contain ICs with switches 524, which respond to the modulated commands from the main tag IC.

When the tag receives unmodulated RF CW signal from the reader, it powers both the main tag IC and those switches. Then the main tag IC can decide which switches to activate. When talking to such steerable tag, the reader may increase the length of the RF CW preamble (during which the tag is powered but not talking to the reader yet) in order to allow sufficient time for the tag to find out the best switches combination to maximize the signal.

Figure 6:
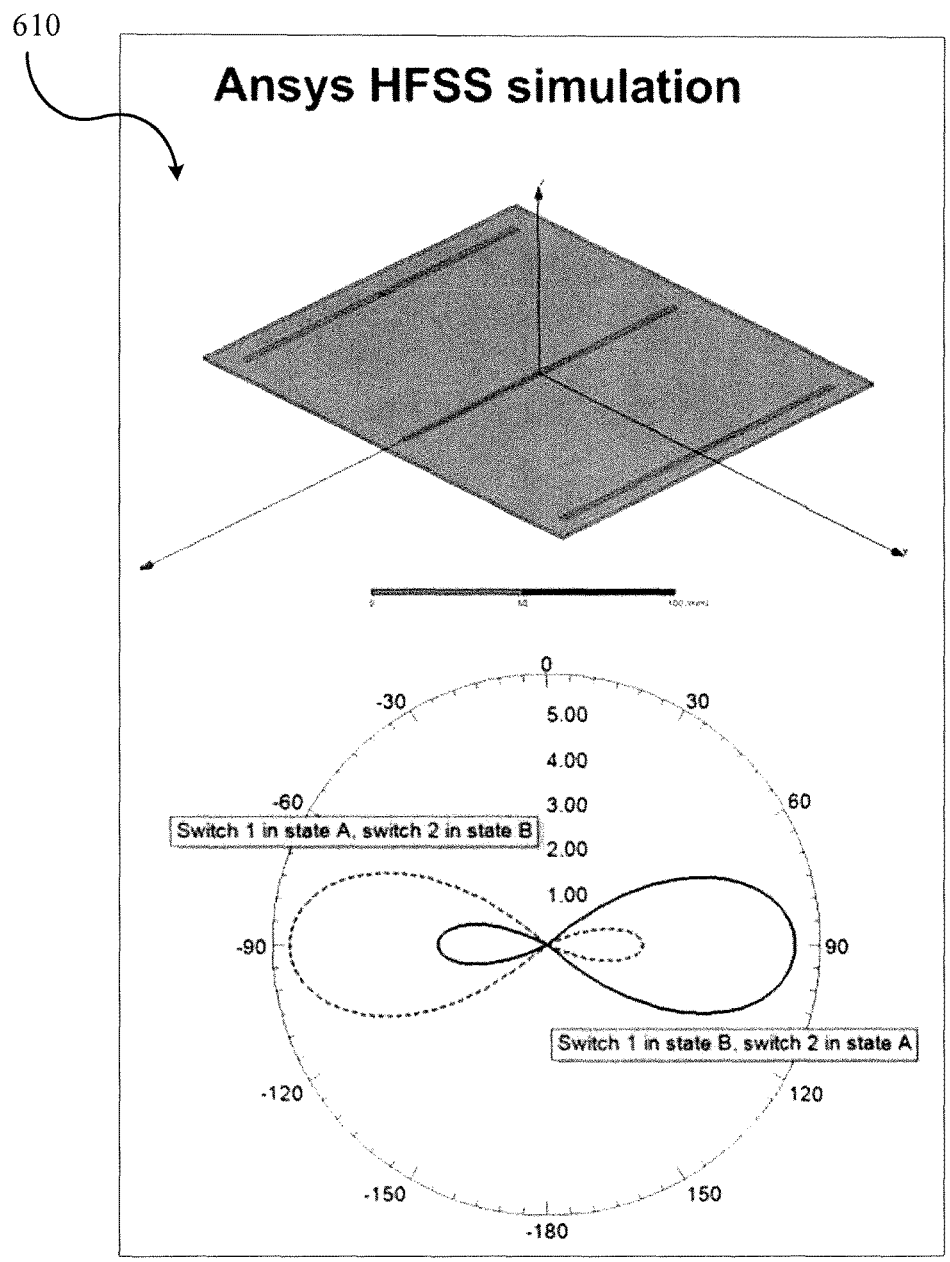
FIGS. 6 and 7 illustrate changes in the radiation pattern of an example implementation of a self-steering antenna device using the models shown in FIGS. 4 and 5, in accordance with an embodiment.
Figure 7:
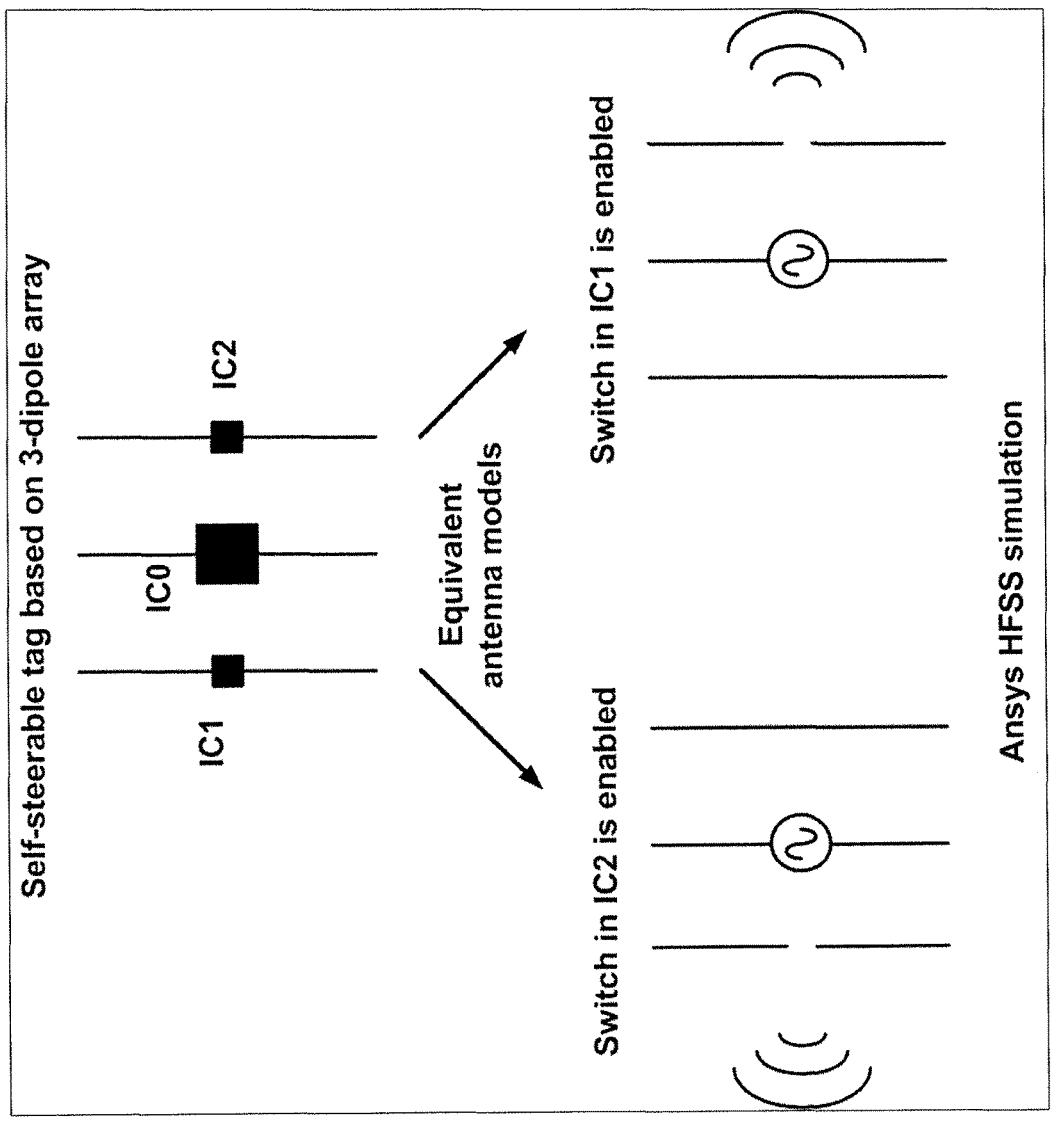

FIG. 6 shows a calculated radiation pattern after steering has been performed via the self-steered RFID tags discussed along with FIGS. 1, 2, 4 and 5, which was also shown and discussed in more general terms along with FIG. 2 for radiation patterns 122 and 124. FIG. 7 shows a common Model 710 for a 3-dipole array model representing the RFID tag configurations discussed in detail along with FIGS. 1, 2, 4 and 5. Note that common model identifies communications between the main tag IC and the element IC as being performed via "equivalent antenna model" to accommodate differences between the tag shown in FIG. 5 and the one in FIG. 6.

Although the tags discussed thus far have only shown a pair of switchable elements, RFID tags can have multiple pairs of switchable elements. Further, in order to shape the radiation pattern effectively, several pairs of elements should be provided around the peripheral region of the tag, and various combinations of elements may need to be combined. As such, it is understood that the tag can have multiple switchable elements. In addition to steering the beam, some of these antenna elements can be used to provide other benefits, such as to compensate for impedance mismatch due to tag environment (self-tuning with antenna elements rather than with variable inductors and capacitors inside the IC itself).

Figure 8:
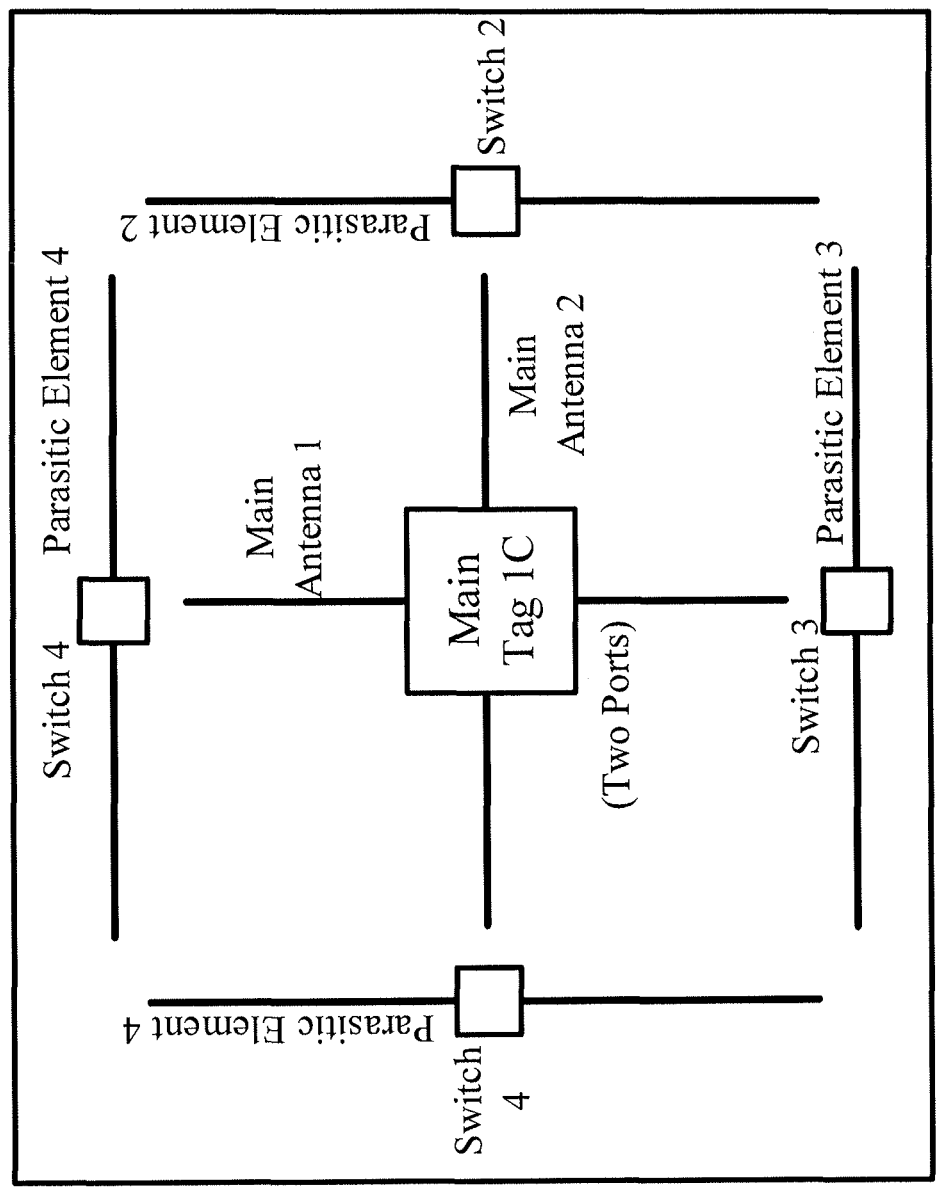
FIG. 8 depicts a self-steering RFID tag architecture having many features discussed along with the models shown in FIGS. 3, 4 and 6, as well as describing additional features in accordance with an embodiment.

Another example of the self-steerable RFID tag 810 is shown in FIG. 8, which shows multiple pairs of elements and additional features, such as two main antenna ports. As shown, the tag has three ICs: main IC, IC0, and two controllable ICs with switches: IC1 and IC2. The tag antenna itself is a symmetric three-element dipole antenna array similar to those discussed above. The elements of the array are printed copper traces, 3 mm wide and 127 mm long, spaced 75 mm apart on 60 mil FR4 substrate (permittivity 4.4), and the tag is designed to operate at 915 MHz Tag 810 was created and modeled using the simulation program known as Ansys HFSS.

In order to design tag 810, two impedance states of the switches were assumed as 30-j170 Ohm (switch OFF) and 10-j50 Ohm (switch ON), which are typical for RFID tag IC front ends with MOSFET modulating transistors. The XY-plane radiation pattern shown in FIG. 6 was created via the same simulation and model, which shows that, depending on the state of the two switches, the antenna pattern can be steered by 180 degrees. The antenna max. gain is 5 dBi, and the front-to-back ration is about 3 db. To obtain higher gain and better front-to-back ratio, one can use antenna array with more elements (for example, five: two on each side of the main tag dipole).

It is understood that the self-steering RFID tags discussed herein can also include sensors and steer its beam according to different criteria (for example, it may sense the change in the environment and adapt to it). One very practical application of the proposed concept is tag networks where passive tags can directly talk to each other when powered by external RF signal. However, the passive tag-to-tag communication distance is currently limited to less than 1 ft. Nonetheless, having a higher gain self-steerable antenna on the tag would allow one to significantly increase this distance for better signal propagation through tag networks.

Figure 9:
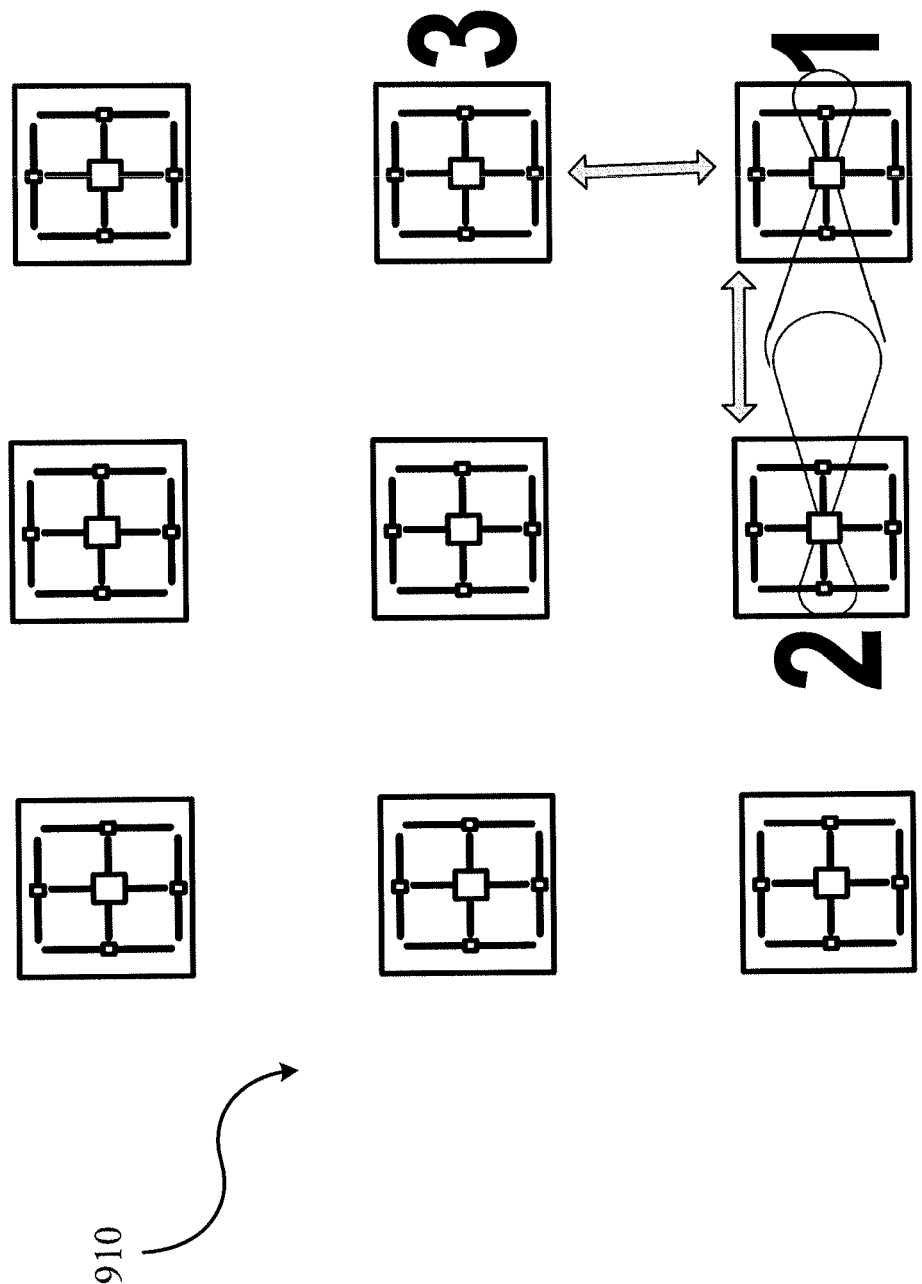
FIG. 9 is a schematic, top view representation as a 3×3 array of the warehouse/transportation scenario discussed along with FIG. 1, but showing only the self-steerable RFID tags alone (no boxes etc.) and using the example self-steering RFIG Tag configuration shown in FIG. 8, in accordance with an embodiment.

As an example, FIG. 9 shows a 2-dimensional tag array of neighboring tags configured to "turn" their beams towards each other when talking to each other. For illustration purposes, the array generally matches a top view of the arrangement of items (boxes) shown in Figure for the warehouse environment example—except that the boxes have been eliminated and only the tags are shown. Further, the two element tags 110 shown in FIG. 1 have been replaced with tag 810 shown in FIG. 8. Tags 910 such as these can have an IC with two RF ports connected to two orthogonal dipoles, all surrounded by four parasitic elements with switches. As a result, the tag can steer its radiation pattern in any of the four directions (up, down, left, right). If more than one switch IC is enabled at a time, other directions are also possible (e.g. +/−45 and +/−135 degrees).

The modulation frequency can be manually changed my modifying the values of the variable resistor and capacitor in the circuit described above. As a result, the antenna radiation pattern switches between two states (two patterns) as shown in FIG. 6. Operations of the antenna device 410 and corresponding circuit shown in FIGS. 4 and 5 were confirmed via physical observations of a test device corresponding to the antenna device of FIGS. 4 and 5. In addition to physical observation of the device during use, operations of a RF power sensor tag with LED sensors confirmed its operations including periodic illumination of LEDs on the test device for the appropriate periods and durations according to anticipated operations of the antenna device.

It is understood that additional antenna elements could be combined with the main first switch and the second switch controlling antenna elements as described above along with FIGS. 4 and 5, which could provide antenna devices having even more parameter options during use. For example, a third parasitic antenna element (e.g., a dipole having its own oscillating circuit that oscillates at a different period than the one described along with FIGS. 4 and 5 could be added to the antenna device, which may provide even more potential operating states depending on the frequencies. If the period of the third parasitic element were twice as long as the period of the first circuit, then the antenna would double its cycle and sequentially rotate through all four possible states (i.e., four because each of the two switching circuits has two states).

In addition, it is understood that aspects, features and benefits of the invention described herein are not unique applicable to, nor limited to, RFID networks, systems or devices. Many possibilities for implementing aspects and features of the invention described herein with other types of antenna devices and systems are possible. Further, implementations with other types of antenna devices are highly likely due to many different properties and parameters of other types of antennas being possible, such as predetermined parameters for antenna patterns, polarizations, and frequency bands that could be implemented without adding any DC bias lines or DC biased feeds to operate the switches.

Further, it is understood that implementations of antenna devices and antenna device systems according to aspects and features of the invention are applicable to numerous and different types of technologies, industries, and devices. For example, an additional implementation not specifically discussed above can include repeatedly cycling through several operational states related to a Wi-Fi access point antenna in a building, such as mounted in a corner of a room, which can be configured to automatically and periodically "scan" the room based on aspects and features of the invention to steering its high gain beam in several possible directions. In another example possible implementation, implementations of aspects and features of the invention with reconfigurable antennas in an aircraft may be especially valuable for aircraft applications due to the lack of a requirement to provide antenna devices with external power.

These and other changes can be made to the invention in light of the above Detailed Description. While the above description describes certain examples, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms.

The flowcharts and block diagrams in the Figures illustrate the architecture, functionality, and operation of possible implementations of systems and methods according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to embodiments of the invention in the form disclosed. Many modifications and variations will be apparent to those of ordinary skill in the art without departing from the scope and spirit of embodiments. The embodiment was chosen and described in order to explain the principles of embodiments and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments have other applications in other environments. This application is intended to cover any adaptations or variations of the present invention. The following claims are in no way intended to limit the scope of embodiments of the invention to the specific embodiments described herein.

What is claimed is:

1. A passive antenna device comprising:
a first main antenna configured to receive an unmodulated wireless signal;
a power harvester configured to obtain power from the unmodulated wireless signal;
a plurality of distributed antennas;
a main switch coupled to the power harvester and powered by the obtained power, the main switch configured to place the passive antenna device in an active mode;
a main circuit powered by the obtained power while in the active mode; and
a controller configured to:
activate different combinations of the plurality of distributed antennas and, for each combination of the plurality of distributed antennas to measure a signal strength at a location on the passive antenna device;
select a particular combination of the plurality of distributed antennas that has a largest signal strength at the location on the passive antenna device during a time when an RFID reader increases a length of preamble of the unmodulated wireless signal, wherein the particular combination of the plurality of distributed antennas has the larger signal strength compared with signal strengths of other combinations of the plurality of distributed antennas at the location on the passive antenna device; and
self-steer a radiation pattern of the passive antenna device by pointing a main beam of the passive antenna device in a direction of the RFID reader based on the selected combination of the plurality of distributed antennas.

2. The antenna device of claim 1, wherein the antenna device is configured to perform actions comprising:
receiving a first wireless signal from the RFID reader;
selecting the first combination of the plurality of distributed antenna antennas to activate to provide a non-symmetric radiation pattern while responding to the first wireless signal;
activating the first combination of the plurality of distributed antennas; and
sending a first response having a first signal strength to the RFID reader.

3. The antenna device of claim 2, wherein the antenna device is configured to perform further actions comprising:
selecting a second combination of the plurality of the distributed antenna for activation that is different than the first combination;
activating the second combination of the plurality of distributed antennas; and
sending a second response having a second signal strength to the RFID reader.

4. The antenna device of claim 3, wherein the antenna device is configured to perform further actions comprising:
if the second signal strength is stronger than the first signal strength, saving the second combination of the plurality of distributed antennas; and
if the second signal strength is not stronger than the first signal strength:
selecting a third combination of the plurality of the distributed antenna for activation;
activating the third combination of the plurality of distributed antennas; and
sending a second response having a second signal strength to the RFID reader.

5. The antenna device of claim 1, wherein the plurality of distributed antennas includes a first distributed antenna and a second distributed antenna spaced apart from the first distributed antenna, and
the antenna device further comprises a first distributed switch corresponding with the first distributed antenna and a second distributed switch corresponding with the second distributed antenna.

6. The antenna device of claim 5, wherein the first distributed antenna includes a first reflector dipole, the second distributed antenna includes a second reflector dipole, and the first and second distributed switches activate the respective first and second distributed dipoles during activation of the combination including the first and second reflector dipole.

7. The antenna device of claim 5, further comprising a second main antenna disposed proximate the first main antenna at a central region of the antenna device and rotated with respect to the first main antenna to have a different angular orientation;
wherein the plurality of distributed antennas includes a third distributed antenna and a fourth distributed antenna spaced apart from the third distributed antenna;
the antenna device further comprises a third distributed switch corresponding with the third distributed antenna and a fourth distributed switch corresponding with the fourth distributed antenna;
wherein the third distributed antenna includes a third reflector dipole, the fourth distributed antenna includes a fourth reflector dipole, and the third and fourth distributed switches activate the respective third and fourth distributed dipoles during activation of the combination including the third and fourth reflector dipole.

8. The antenna device of claim 7, wherein:
the main circuit is disposed between each of the first and second distributed antenna and the third and fourth distributed antenna,
the main circuit is centrally located within the central region of the antenna device and the plurality of distributed antennas are disposed along perimeter regions of the antenna device; and
one or more combinations of the distributed, perimeter antenna are activated and controlled to provide an enhanced radiation pattern directed toward an RFID reader.

9. The antenna device of claim 1, wherein the plurality of distributed antennas includes a plurality of parasitic antenna devices, each parasitic antenna device comprising:
a parasitic circuit element;
a driven circuit element;
the power harvester configured to obtain power from the unmodulated wireless signal; and
a control module coupled with the parasitic circuit element and the driven circuit element and powered by the power harvester,
wherein the control module is configured to communicate with the controller of the antenna device to selectively activate the parasitic antenna device and drive the driven circuit element to provide the radiation pattern.

10. The antenna device of claim 9, wherein the plurality of distributed antennas includes:

a first parasitic antenna element; and
a second parasitic antenna element spaced apart from the first parasitic antenna element;
wherein the main circuit is disposed between the first and second parasitic antenna elements.

11. The antenna device of claim 8, further comprising a second main antenna disposed proximate the first main antenna at the central region of the antenna device and rotated with respect to the first main antenna to have a different angular orientation;
wherein the plurality of distributed antennas includes a third parasitic antenna element and a fourth parasitic antenna element spaced apart from the third parasitic antenna element;
the antenna device further comprises a third control module corresponding with the third parasitic antenna element and a fourth control module corresponding with the fourth parasitic antenna element;
wherein the third distributed antenna element includes a third reflector dipole, the fourth distributed antenna element includes a fourth reflector dipole, and the third and fourth distributed switches activate the respective third and fourth distributed dipoles during activation of the combination including the third and fourth reflector dipole.

12. A passive, self-steering RFID tag comprising:
a first main antenna disposed in a central region of the tag;
a second main antenna configured to receive an unmodulated wireless signal for powering a device;
a power harvester configured to obtain power from the unmodulated wireless signal;
a plurality of peripheral distributed antenna elements configured to direct a radiation pattern of the RFID tag;
a main switch coupled to the power harvester and configured to activate selectively the passive RFID tag;
a main circuit disposed in the central region and powered by the obtained power while in the active mode; and
a control unit configured to automatically operate responsive to receiving input from a RFID reader and without receiving control information to:
activate different combinations of the plurality of the peripheral distributed antenna elements, the different combinations includes a first combination and a second combination, the first combination including a first plurality of antennas and the second combination including a second plurality of antennas, the first plurality of antennas being different from the second plurality of antennas, and
for each combination of the plurality of distributed antennas, to measure a signal strength at a location on the passive antenna device so that a signal strength of the first plurality of antennas is measured and a signal strength of the second plurality of antennas is measured;
select the first combination in response to the first combination having a largest signal strength at the location on the passive antenna device compared with signal strengths of other combinations of the plurality of distributed antennas, including the second combination, at the location on the passive antenna device; and
self-steer a radiation pattern of the passive antenna device by pointing a main beam of the passive antenna device in a direction of the RFID reader based on the selected combination of the plurality of distributed antennas.

13. The RFID tag of claim 12, wherein the second main antenna is disposed proximate the first main antenna at a central region of the RFID tag and is rotated with respect to the first main antenna element to have a different angular orientation.

* * * * *